United States Patent
Sjogren

(10) Patent No.: US 8,619,268 B2
(45) Date of Patent: Dec. 31, 2013

(54) APPARATUS AND METHOD FOR THICKNESS DETECTION

(75) Inventor: John Faber Sjogren, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 508 days.

(21) Appl. No.: 12/689,089

(22) Filed: Jan. 18, 2010

(65) Prior Publication Data

US 2011/0176149 A1 Jul. 21, 2011

(51) Int. Cl.
*G01C 3/08* (2006.01)
*G01N 21/86* (2006.01)
*G02B 6/00* (2006.01)

(52) U.S. Cl.
USPC .......................... 356/630; 356/429; 356/445

(58) Field of Classification Search
USPC ........................................................ 356/630
See application file for complete search history.

(56) References Cited

U.S. PATENT DOCUMENTS

| | | | | |
|---|---|---|---|---|
| 3,771,873 A | * | 11/1973 | Tourret | 356/4.07 |
| 5,805,291 A | * | 9/1998 | Calvin et al. | 356/429 |
| 7,590,314 B1 | | 9/2009 | Sjogren et al. | |
| 7,880,156 B2 | * | 2/2011 | Shakespeare | 250/559.4 |
| 2004/0263868 A1 | * | 12/2004 | Isei et al. | 356/630 |
| 2009/0059244 A1 | * | 3/2009 | Hellstrom et al. | 356/630 |
| 2010/0079297 A1 | | 4/2010 | Sjogren | |

\* cited by examiner

*Primary Examiner* — Gregory J Toatley
*Assistant Examiner* — Rebecca C Bryant
(74) *Attorney, Agent, or Firm* — Hovey Williams LLP

(57) ABSTRACT

An apparatus and method for detecting an increase in thickness of a strip of material from a desired thickness. The apparatus may comprise a light source, a light detector, an indicator, a first fiber optic cable coupled with the light source, a second fiber optic cable coupled with the light detector, and a housing. The housing may comprise a material slot for passing the strip of material therethrough and fixing optical fibers of the first fiber optic cables to reflect light off of a first and second face of the strip of material into optical fibers of the second fiber optic cable. The amount of light detected by the light detector depends on the proximity of each of the faces of the strip of material to ends of the optical fibers. The thicker the strip of material, the less light received by the light detector, which may actuate the indicator.

11 Claims, 7 Drawing Sheets

APPARATUS AND METHOD FOR THICKNESS DETECTION

BACKGROUND

1. Field

The present invention relates to an apparatus and method for sensing a change in a thickness of a strip of material from a desired thickness. More particularly, the present invention relates to a sensor using fiber optic light detection to determine a change in thickness of a material.

2. Related Art

Composite tape strips are used to form composite parts, such as those used in the manufacture of aircrafts. In a lay-up process, strips of the composite tape are applied to a surface, layered, and then cured by pressure and heat to form a strong, light-weight composite part.

During the production of composite tape or tow, flawed portions of the tow may be cut out, resulting in two cut ends which may be spliced together. This increases the thickness of the composite tape in the location where the strips have been spliced. Depending on the product being manufactured, limits may be placed on the number of splices within a given area and/or the minimum spacing of splices along any singular composite tow.

When a splice is inserted into the composite tow, three light colored stripes are painted in the region of the splice. Inspectors may look over the surface where the tows have been laid and look for these stripes, but doing so is difficult because the stripes are often hard to see. Automatic ways of detecting the stripes have proven error prone due to the variation of stripe quality. Additionally, splices made during the fiber placement process are sometimes not marked at all and therefore nearly impossible to detect.

Accordingly, there is a need for an improved splice detector that overcomes the limitations of the prior art.

SUMMARY

The present invention provides a thickness detection apparatus and method for determining when a thickness of a strip of material varies from a desired thickness. The strip of material may have a first edge, a second edge, a first face, and a second face opposite of the first face. The apparatus may comprise a detection element, a sending fiber optic cable having a plurality of optical fibers, a receiving fiber optic cable having a plurality of optical fibers, and a housing for fixing individual ones of the optical fibers from the sending and receiving cables in side-by-side alternating spaced relationship with each other.

The detection element may include a light source, a light detector, and an indicator having a first state and a second state. Light from the light source may be sent through the sending cable which may be reflected off of the strip of material into the receiving cable. The light may then be transmitted through the sending cable to the light detector. The indicator will be in a first state if an amount of light received by the light detector is equal to or above a threshold of tolerance. Otherwise, the indicator will be in a second state. For example, the second state may produce a visible, audible, or electrical signal to a user or an automated system. The electrical signal may additionally trigger a counter to increase by one to track how many splices are detected in the strip of material. If there are too many splices in a strip of material, for example, it may be discarded.

The sending cable may be configured such that a first subset of its optical fibers are aligned to reflect light into a first subset of optical fibers of the receiving cable, and a second subset of its optical fibers are aligned to reflect light into a second subset of optical fibers of the receiving cable. The first subset of optical fibers may be directed toward a first side of the strip of material and the second subset of optical fibers may be directed toward a second side of the strip of material.

In one embodiment of the invention, the housing may hold ends of the first and second subsets of optical fibers a space apart from each other such that a strip of material may be fed therebetween. The space between the ends of the first subset of optical fibers and the ends of the second subset of optical fibers may be equal to or less than twice a peak reflected light distance (PRLD) or a back peak domain (BPD) plus twice the least reflected light distance (LRLD) plus an amount approximately equal to a desired thickness of the strip of material. The PRLD may be defined as extending from the first or second subset of optical fiber ends of the sending cable to a determined surface position at which a peak amount of light is returned to the first or second subset of the optical fibers of the receiving cable. The LRLD may be defined as extending from the first or second subset of optical fibers of the sending cable to a determined surface position at which the amount of light returned to the first or second subset of optical fibers of the receiving cable is at a minimum due to light fields and receiving fields having a minimum overlap. The BPD may be defined as extending from the PRLD to the LRLD.

The method of determining when the strip of material varies from the desired thickness may comprise placing the strip of material in the material slot and sending light through the optical fibers of the sending cable. The receiving cable then receives light from a light source and transmits the light to the light detector. The method then determines if the amount of light detected is below a threshold of tolerance. The threshold of tolerance may be less than the desired amount of light by an amount considered tolerable for a given system. The desired amount of light may correspond to the desired thickness of the strip of material and the thickness of the strip of material may be inversely proportional to the amount of light detected. The method may further comprise outputting an audible, visual, electrical, or wireless indicator signal to a user or an automated system if the amount of light detected is below the threshold of tolerance. For example, if the amount of light detected is below the threshold of tolerance, this may indicate a splice in the strip of material. If the number of splices detected over a particular length of the strip of material is greater than a desired limit, a user may discard the strip of material.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
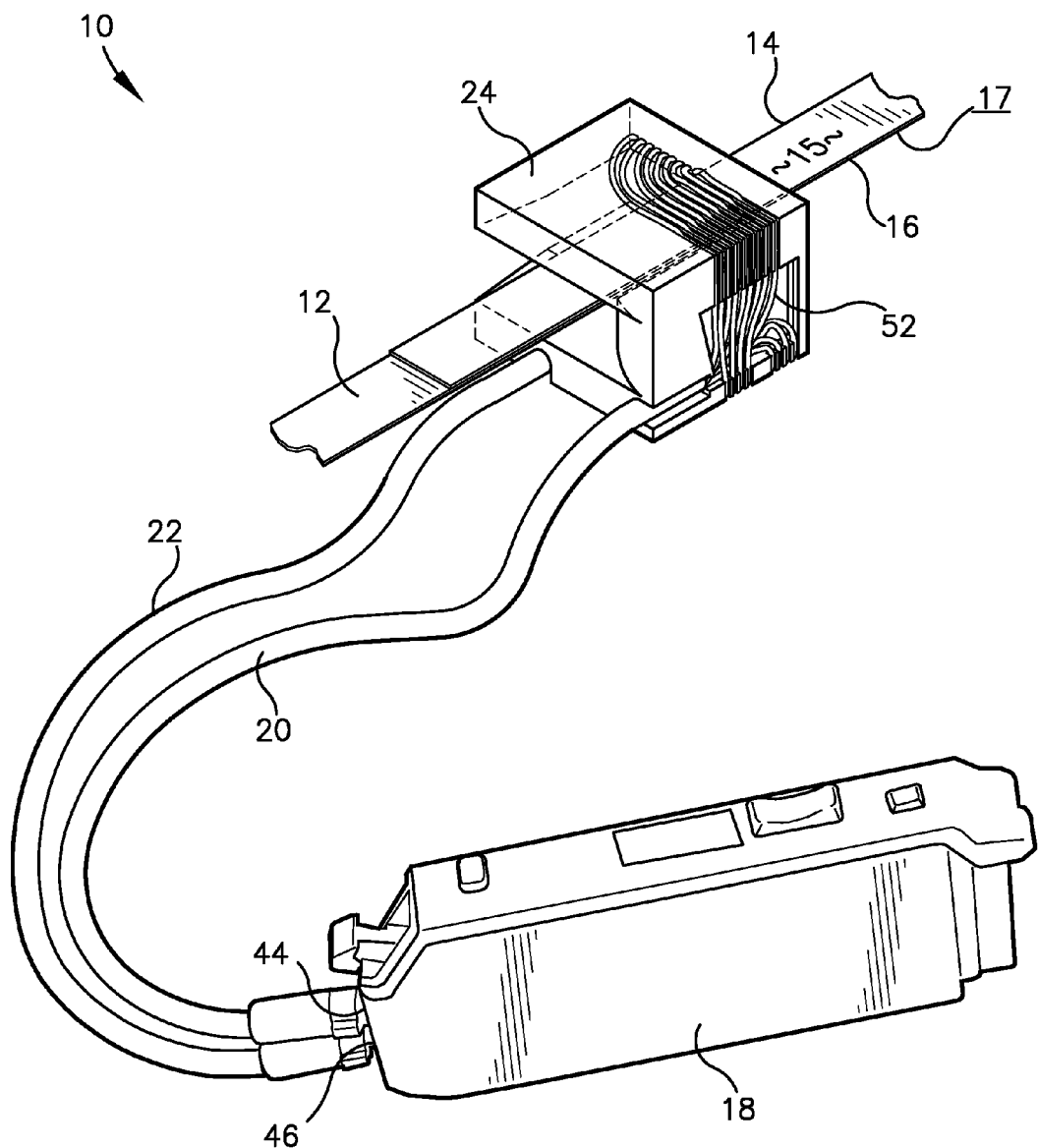
FIG. 1 is a perspective view of a thickness detection apparatus constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In accordance with various embodiments of the present invention, FIG. 1 illustrates a thickness detection apparatus 10 for detecting a change in thickness of a strip of material 12 from a desired thickness. The strip of material 12 may have a first edge 14, a second edge 16 opposite of the first edge 14, a first face 15, and a second face 17 opposite of the first face 15. The strip of material 12 may be any material such as composite tape, ribbons, glass, metal, plastic, fabric, organic material, etc., and may be of any dimension. In one particular embodiment, the strip of material 12 is composite tape used for manufacturing composite aircraft parts and is between 0.125 to 0.50 inches wide and 0.004 to 0.010 inches thick.

The thickness detection apparatus 10 may comprise a detection element 18, a sending fiber optic cable 20 coupled to the detection element 18, a receiving fiber optic cable 22 coupled to the detection element 18, and a housing 24 for fixing portions of the cables 20,22 in a spaced relationship to each other such that light from the sending cable 20 reflected off of the strip of material 12 may be received by the receiving cable 22.

Figure 2:
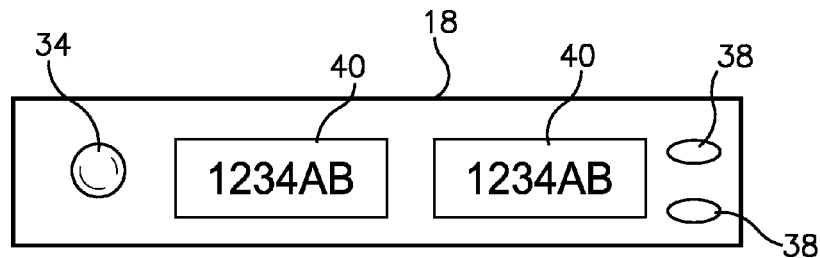
FIG. 2 is a top plan view of a detection element of the thickness detection apparatus of FIG. 1.
Figure 3:
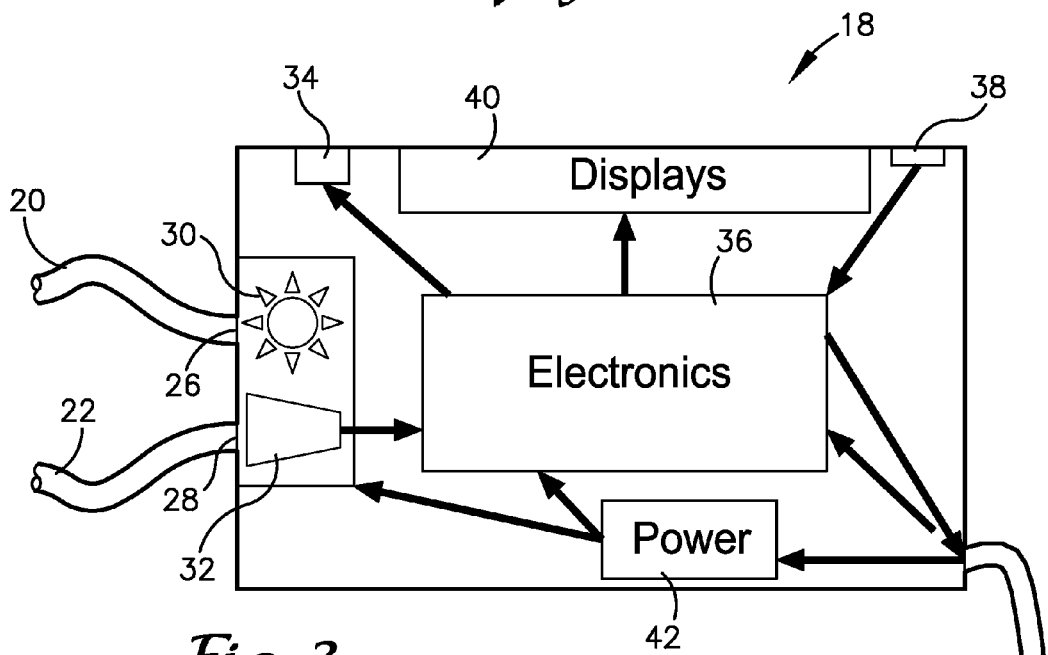
FIG. 3 is a schematic view of the detection element of FIG. 2.
Figure 4:
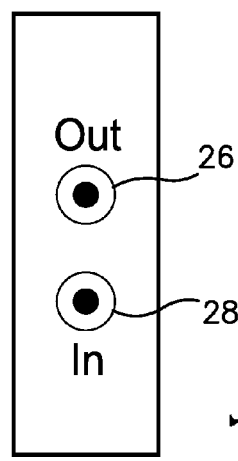
FIG. 4 is a side view of the detection element of FIG. 2.

The detection element 18 may be any apparatus for sending and receiving light and outputting a response based on the amount of light received. For example, as illustrated in FIGS. 2-4, the detection element 18 may include a light source 30, an output 26 coupled with the light source 30 and configured for attaching to sending fiber optic cable 20, a light detector 32, an input 28 coupled with the light detector 32 and configured for attaching to the receiving fiber optic cable 22, an indicator 34 having a first state and a second state, and a comparator 36. For example, in one embodiment of the invention, the detection element 18 may be the KEYENCE FS-V30 amplifier. The detection element 18 may be of any size, but in various embodiments of the invention, it may have a width of between 1 inch and 10 inches, a height of between 0.3 inches and 8 inches, and a thickness of between 0.05 inches and 3 inches. Furthermore, the detection element 18 may have a width of between 2 inches and 4 inches, a height of between 0.5 inches and 3 inches, and a thickness of between 0.2 inches and 0.6 inches. Specifically, the detection element 18 may further have a width of between 2.5 and 3.5 inches, a height of between 1 inch and 2 inches, and a thickness of between 0.3 inches and 0.5 inches.

The light source 30 may send light out through the output 26 of the detection element 18 and may be any light emitter known in the art for transmitting light through fiber optic cables. For example, the light source 30 may be laser diodes, LEDs, and the like.

The light detector 32 may receive light through the input 28 of the detection element 18 and may be any light detector 32 known in the art for turning light signals into electrical signals. For example, the light detector 32 may be a photo resistor, a photo cell, photo transistor, photo diode such as a silicon PIN photodiode, etc.

The comparator 36 compares the actual amount of light received by the light detector 32 with a desired amount of light and trigger the indicator 34 if the actual amount of light received is below a pre-determined threshold of tolerance. The threshold of tolerance may be less than the desired amount of light by an amount considered tolerable for a given system. In some embodiments of the invention, the threshold of tolerance may include a range of values a set amount above and below a desired amount of light. The desired amount of light may correspond to the desired thickness of the strip of material 12. For example, if the light received is above the threshold of tolerance, then the indicator 34 may not be triggered. However, if the light received is below the threshold of tolerance, then the indicator 34 may be triggered. In some embodiments of the invention, the threshold of tolerance may be equal to the desired amount of light, such that any amount of light below the desired amount of light may trigger the indicator 34. Additionally or alternatively, in some embodiments of the invention, if the light received is greater than the threshold of tolerance or a threshold amount greater than a desired amount of light, the indicator 34 or an additional indicator (not shown) may be triggered to indicate that the strip of material 12 is thinner than desired.

The comparator 36 may be any number and combination of processors, controllers, integrated circuits, programmable logic devices, or other computing devices and resident or external memory for storing data. Specifically, the comparator 36 may be configured to receive a first electrical signal from the light detector 32 representing the actual amount of light detected and to compare the first electrical signal with a desired electrical signal representing the desired amount of light and/or the threshold of tolerance. Furthermore, the comparator 36 may be configured to send a signal commanding the indicator 34 to switch to the second state or to switch on if the first electrical signal is below the threshold of tolerance.

The indicator 34 may be any device known in the art that is operable to change from a first state to a second state depending on the input it receives. For example, the indicator 34 may produce an audible, visual, electrical, and/or wireless signal to notify a user or an electronic device that the actual amount of light detected by the light detector 32 of the detection element 18 is below the threshold of tolerance. Specifically, when the amount of light detected is below the threshold of tolerance, the comparator 36 may send an electrical signal to the indicator 34 to change the state of the indicator 34 from a first state to a second state. For example, the first state of the indicator 34 may be a state in which the indicator 34 is off, and the second state of the indicator 34 may be a state in which the indicator 34 is on.

The detection element 18 may also comprise a user interface 38 and one or more displays 40, all of which may be communicably coupled with the comparator 36. For example, the user interface 38 may allow a user to program into memory the desired amount of light to be received by the light detector 32 and/or the threshold of tolerance. The user interface 38 may comprise one or more functionable inputs such as buttons, switches, scroll wheels, a touch screen associated with the displays, voice recognition elements such as a microphone, pointing devices such as mice, touchpads, tracking balls, styluses, a camera such as a digital or film still or video camera, combinations thereof, etc. Further, the user interface 38 may comprise wired or wireless data transfer elements such as a removable memory to enable the user and other devices or parties to remotely interface with the thickness detection apparatus 10.

The displays 40 may be one or more displays 40 coupled with the comparator 36 and may be operable to display various information corresponding to or determined by the detection element 18, such as the actual amount of light detected, a percentage of the actual amount of light detected compared to the amount of light transmitted by the light source, the desired amount of light, the threshold of tolerance, a desired thickness of the strip of material 12, whether the strip of material 12 is thicker than desired, a rate at which the strip of material is being evaluated, if a splice is detected, a quantity of splices detected, a frequency of splices detected, etc. The displays 40 may comprise conventional black and white, monochrome, or color display elements including CRT, TFT, LCD, and/or plasma display devices. The displays 40 may be integrated with the user interface 38, such as in embodiments where the displays 40 are touch-screen displays 40 to enable a user to interact with them by touching or pointing at display areas to provide information to the thickness detection apparatus 10.

The detection element 18 may further comprise an internal or external power source 42. The power source 42 may provide electrical power to various components of the detection element 18. For example, the power source 42 may be directly or indirectly coupled with the light source 30, the light detector 32, the comparator 36, the indicator 34, the user interface 38, and the displays 40. The power source 42 may comprise conventional power supply elements such as batteries, battery packs, etc. The power source 42 may also comprise power conduits, connectors, and receptacles operable to receive batteries, battery connectors, or power cables.

Figure 5:
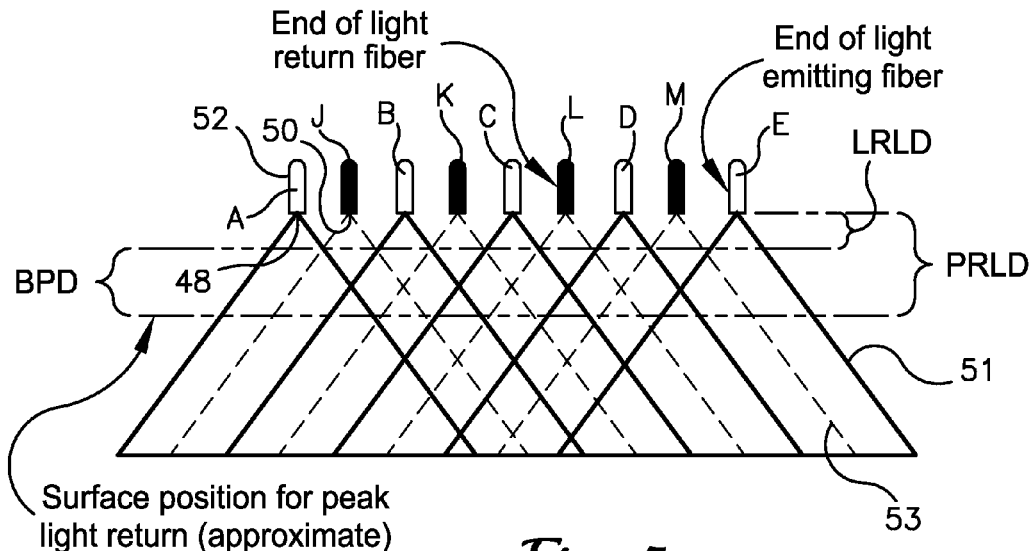
FIG. 5 is a schematic diagram of optical fibers in the detection element and illustrates overlapping light fields and a surface position for peak light return.
Figure 6:
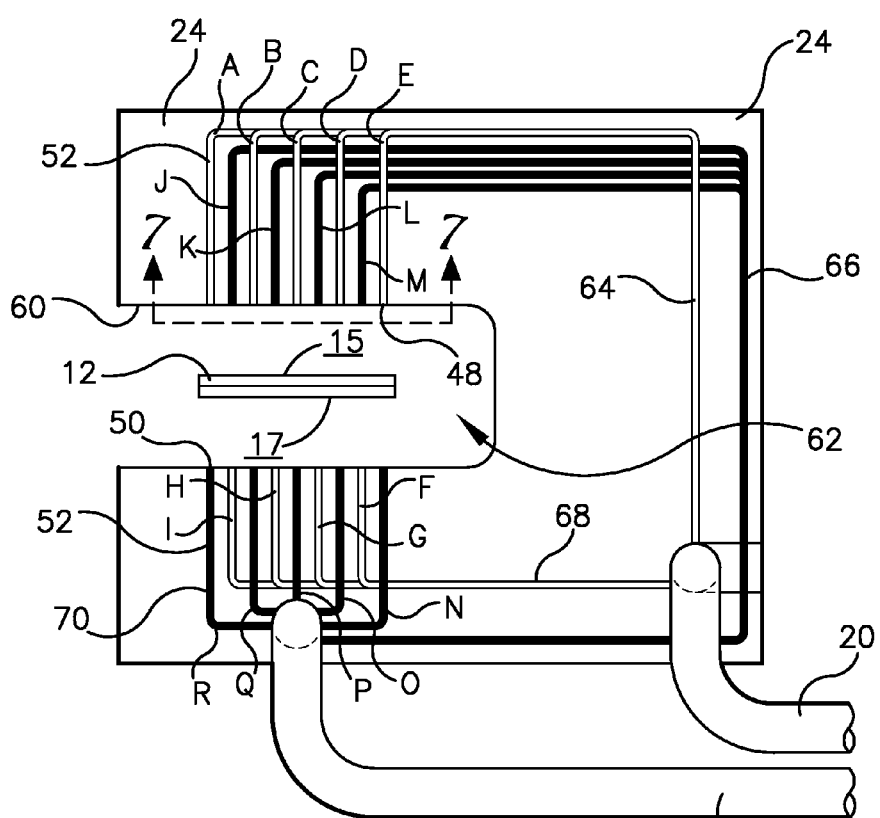
FIG. 6 is a vertical front fragmentary view of the housing and optical fibers of the thickness detection apparatus of FIG. 1.
Figure 7:
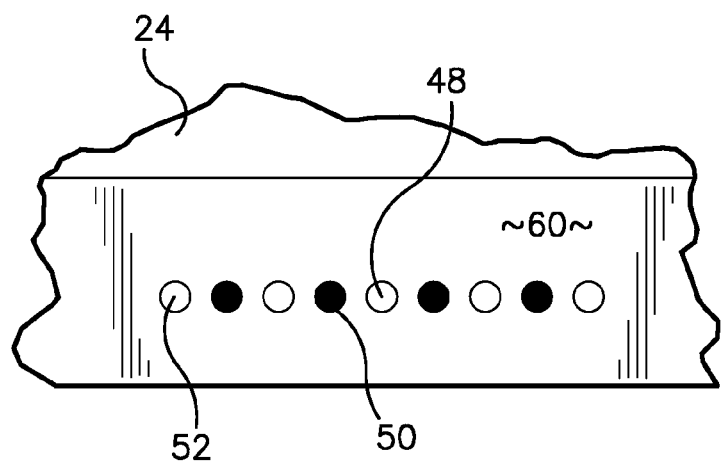
FIG. 7 is a fragmentary view of an inwardly facing wall of the housing of FIG. 6.

As illustrated in FIG. 1, the sending and receiving cables 20,22 may be fiber optic cables or any other conduits through which light may be transmitted to and from the detection element 18. Each cable 20,22 comprises one or more individual optical fibers 52 bundled in an outer sheath and has a first end 44,46 and a second end 48,50. In one embodiment, as illustrated in FIGS. 5-6, the sending cable 20 comprises nine optical fibers—optical fiber A, optical fiber B, optical fiber C, optical fiber D, optical fiber E, optical fiber F, optical fiber G, optical fiber H, and optical fiber I—each having a first end 44 and a second end 48. Likewise, the receiving cable 22 may comprise nine optical fibers—optical fiber J, optical fiber K, optical fiber L, optical fiber M, optical fiber N, optical fiber O, optical fiber P, optical fiber Q, and optical fiber R—each having a first end 46 and a second end 50.

The fiber optic cables 20,22 may be of conventional sizes and configurations. The first end 44 of the sending cable 20 may be coupled to the output 26 of the detection element 18, such that the sending cable 20 may receive light from the light source 30. The second end 48 of the sending cable 20 may be positioned to reflect light into the second end 50 of the receiving cable 22. The first end 46 of the receiving cable 22 may be coupled to the light detector 32 of the detection element 18 to transmit light to the light detector 32.

As illustrated in FIG. 1 and FIGS. 6-10, the housing 24 may be formed of any substantially durable material, such as glass or plastic. For example, the housing 24 may be formed of polycarbonate resin thermoplastic such as LEXAN. Additionally, the housing 24 may be fabricated by solid freeform fabrication (SFF), rapid prototype methods, injection molding, or other traditional methods known in the art. In various embodiments of the invention, the housing 24 may be translucent, such that light may travel through at least a portion of the housing 24. The housing 24 may be any size and may be comprised of multiple parts. However, in various embodiments of the invention, the housing 24 may have a length and/or width of between 0.25 inches and 1 inch, and a thickness of between 0.01 inches and 0.5 inches. The housing 24 may further have a length and/or width of between 0.5 inches and 0.8 inches, and a thickness of between 0.025 inches and 0.2 inches.

Figure 8:
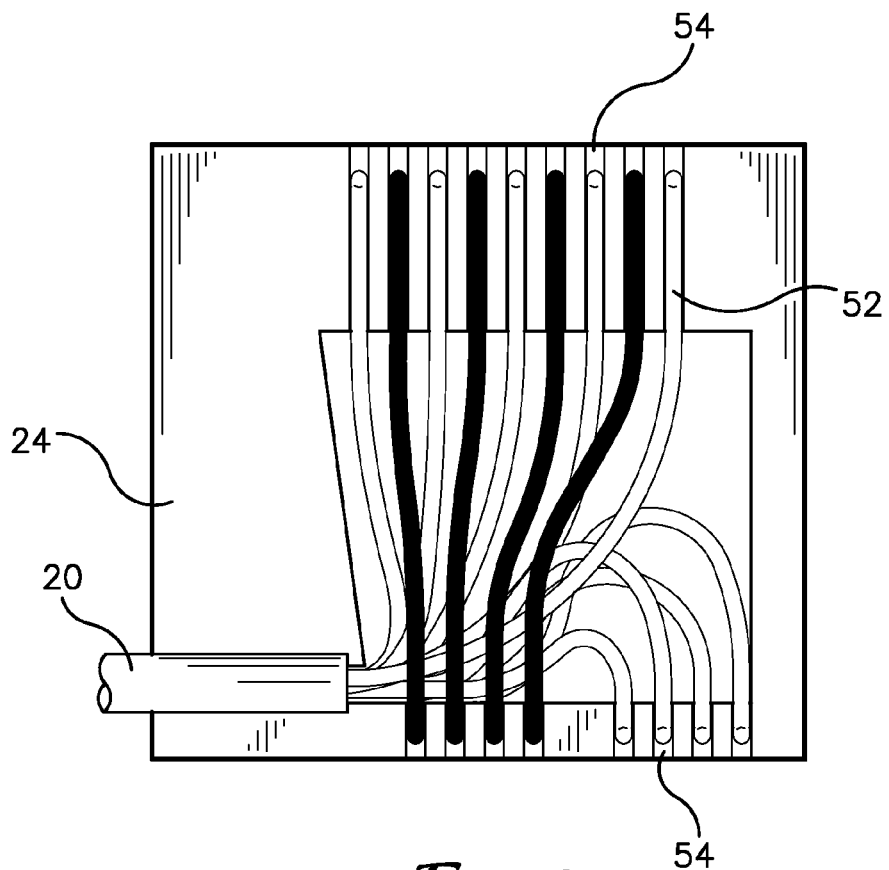
FIG. 8 is a top view of the housing of FIG. 6.
Figure 9:
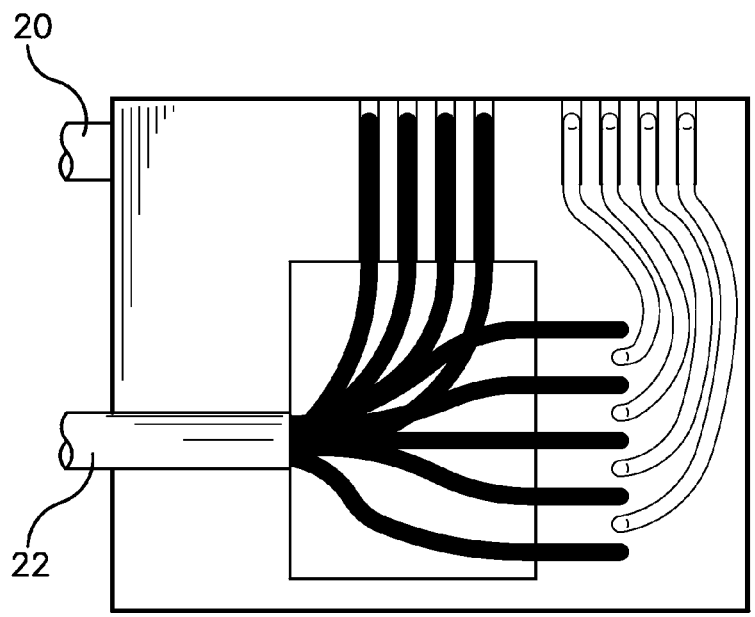
FIG. 9 is a bottom view of the housing of FIG. 6.

The housing 24 may be formed around at least a portion of the sending cable 20 and the receiving cable 22. For example, as illustrated in FIG. 8, grooves 54 and/or tunnels may be formed into the housing 24 in which the cables 20,22 and individual optical fibers 52 may be placed. Specifically, the housing 24 may place the second end 48 of the sending cable 20 and the second end 50 of the receiving cable 22 in spaced relationship to each other such that a portion of light from the second end 48 of the sending cable 20 may be received by the second end 50 of the receiving cable 22 when reflected from a common surface.

Furthermore, the housing 24 may fix second ends 48 of the individual optical fibers 52 of the sending cable 20 in a spaced, side-by-side relationship of one or more rows, with the second ends 50 of individual optical fibers 52 of the receiving cable 22 fixed in the same row or rows and placed in alternating succession with the second ends 48,50 of the optical fibers 52 of the sending cable 20. The housing 24 may also provide light field and receiving field shaping and focusing features at or proximate to the second ends 48,50 of the cables 20,22. Note that portions of the optical fibers 52 proximate each of the second ends 48,50 may also be considered part of the second ends 48,50 and may be fixed substantially parallel with each other, as illustrated in FIG. 6. For example, the second end 50 of optical fiber J of the receiving cable 22 may be located between the second end 48 of optical fiber A and the second end 48 of optical fiber B of the sending cable 20, as illustrated in FIG. 6. In one embodiment of the invention, the optical fibers 52 may be fixed with their second ends 48,50 substantially parallel with each other in the following, side-by-side order: optical fiber A, optical fiber J, optical fiber B, optical fiber K, optical fiber C, optical fiber L, optical fiber D, optical fiber M, optical fiber E. Furthermore, the optical fibers 52 may be fixed with their second ends 48,50 substantially parallel with each other in the following, side-by-side order: optical fiber N, optical fiber F, optical fiber O, optical fiber G, optical fiber P, optical fiber H, optical fiber Q, optical fiber I, and optical fiber R.

Figure 10:
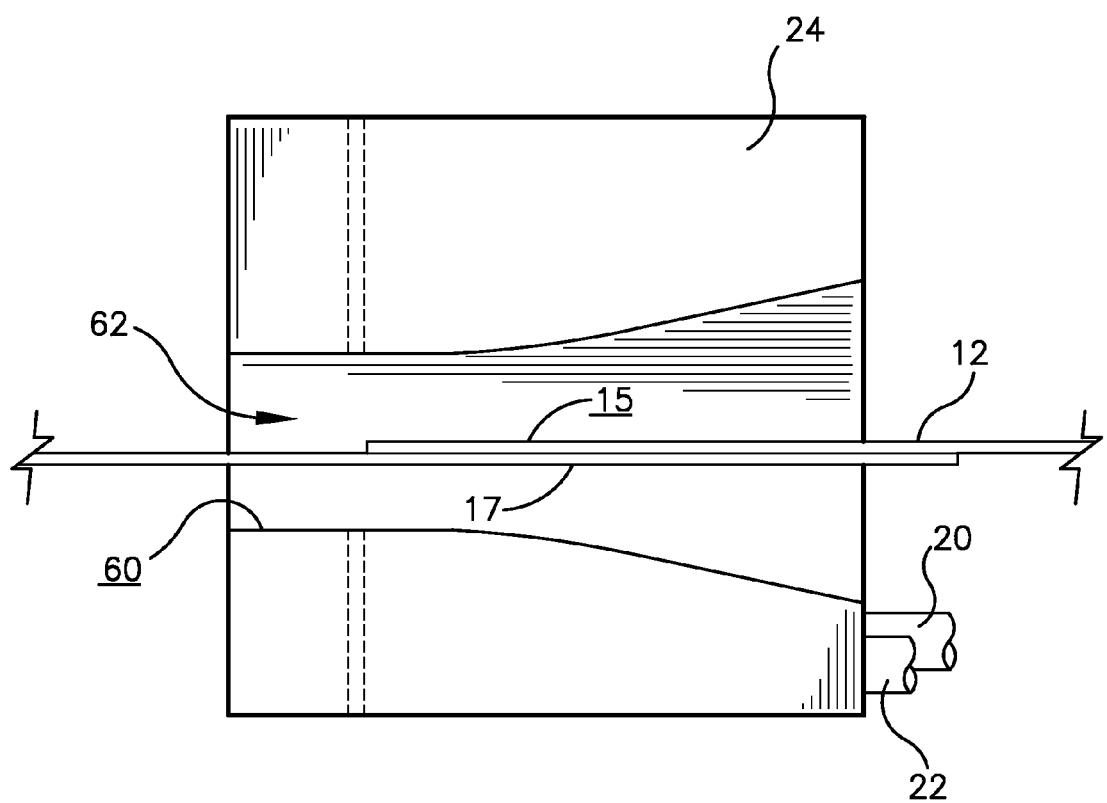
FIG. 10 is a side view of the housing of FIG. 6.

The housing 24 may additionally comprise inwardly facing surfaces 60 forming a boundary of a material slot 62 through which the strip of material 12 may be placed, as illustrated in FIGS. 6 and 10. The material slot 62 may specifically be configured such that light from the sending cable 20 may pass through the material slot 62 in a general direction toward the first face 15 of the strip of material 12 and/or toward the second face 17 of the strip of material 12. The inwardly facing surfaces 60 may comprise and be flush with the second ends 48,50 of the optical fibers 52 and may face the first face 15 and/or the second face 17 of the strip of material 12. The inwardly facing surfaces 60 may limit the motion of the strip of material 12 in a direction of the thickness of the strip of material 12, depending on the distance between opposing faces of the inwardly facing surfaces 60 (i.e. the height of the material slot 62), as later described herein.

In various embodiments of the invention, the second ends 48,50 of the optical fibers 52 are fixed within the housing 24 in an orientation for directing light onto and/or receiving reflected light from the first face 15 of the strip of material 12 and/or the second face 17 of the strip of material 12 when the strip of material 12 is in a proper orientation. The strip of material 12 is in the proper orientation when it is positioned substantially parallel with the second ends 48,50 of the optical fibers 52 and/or substantially perpendicular to the optical fiber portions proximate each of the second ends 48,50. In some embodiments of the invention, the optical fibers 52 of each of the fiber optic cables 20,22 may be divided into a first subset 64,66 and a second subset, 68,70. The first subsets 64,66 of the optical fibers 52 may be oriented toward the first face 15 of the strip of material 12 while the second subsets 68,70 of the optical fibers 52 may be oriented toward the second face 17 of the strip of material 12 when the strip of material 12 is in the proper orientation.

For example, as illustrated in FIG. 6, the first subset 64 of the sending cable 20 may comprise optical fiber A, optical fiber B, optical fiber C, optical fiber D, and optical fiber E, and the first subset 66 of the receiving cable 22 may comprise optical fiber J, optical fiber K, optical fiber L, and optical fiber M. Furthermore, the second subset 68 of the sending cable 20 may comprise optical fiber F, optical fiber G, optical fiber H, and optical fiber I, and the second subset 70 of the receiving cable 22 may comprise optical fiber N, optical fiber O, optical fiber P, optical fiber Q, and optical fiber R.

In various embodiments of the invention, as illustrated in FIG. 6, when at least a portion of the strip of material 12 is properly disposed within the material slot 62, the optical fibers 52 of the first subset 64 of the sending cable 20 are positioned to shine light on the first face 15 of the strip of material 12. Furthermore, the optical fibers 52 of the second subset 68 of the sending cable 20 are configured to shine light on the second face 17 of the strip of material 12 when the material 12 is in the proper orientation. Additionally, the optical fibers 52 of the first subset 66 of the receiving cable 22 may be configured to receive reflected light from the first face 15 of the strip of material 12 and optical fibers 52 of the second subset 70 of the receiving cable 22 may be configured to receive reflected light from the second face 17 of the strip of material 12. The reflected light may be a portion of the light that was sent through the sending cable 20 and then bounced off of the strip of material 12 toward optical fibers 52 of the receiving cable 22, when the material is in the proper orientation. The amount of reflected light received by the receiving cable 22 is dependent on the distance of the first face 15 and/or the second face 17 of the strip of material 12 from the ends 48,50 of the fiber optic cables 20,22. Furthermore, the total light reflected into the receiving cable 22 may be inversely proportional to the thickness of the strip of material 12, such that the thicker the strip of material 12, the less light is reflected into the receiving cable 22 and transmitted to the light detector 32.

The distance between the first subsets 64,66 and the second subsets 68,70 and/or the height of the material slot 62 may be related to a desired thickness of the strip of material and/or a back peak domain (BPD) determined for the optical fibers 52. As illustrated in FIG. 5, a peak reflected light distance (PRLD) may be a range extending from ends of light-sending optical fibers to a surface position of the strip of material 12 at which a peak amount of light is returned to adjacent light-receiving optical fibers. For example, the PRLD may be defined as a range extending from second ends 48 of the first subset 64 of the sending cable's optical fibers to a determined surface position of the strip of material 12 at which a peak amount of light is returned to the first subset 66 of the optical fibers 52 of the receiving cable 22. The PRLD may also be defined as a range extending from second ends 48 of the second subset 68 of the sending cable's optical fibers to a determined surface position of the strip of material 12 at which a peak amount of light is returned to the second subset 70 of the optical fibers 52 of the receiving cable 22.

A least reflected light distance (LRLD) may be defined as a range extending from the second ends 48 of the first subset 64 of the sending cable's optical fibers to a determined surface position of the strip of material 12 at which a reduced amount of light is returned to the first subset 66 of the optical fibers 52 of the receiving cable 22 due to light fields 51 extending from the second ends 48 having a minimum overlap with receiving fields 53 of the second ends 50, as illustrated in FIG. 5. The LRLD may also be defined as a range extending from the second ends 48 of the first subset 68 of the sending cable's optical fibers to a determined surface position of the strip of material 12 at which a reduced amount of light is returned to the first subset 70 of the optical fibers 52 of the receiving cable 22 due to the light fields of the second ends 48 having a minimum overlap with the receiving fields of the second ends 50. The BPD may be defined as extending from the PRLD to the LRLD.

If the PRLD for the first subsets 64,66 of the optical fibers 52 is different than the PRLD determined for the second subsets 68,70 of the optical fibers 52, the smaller of the two PRLD ranges may be used to select the distance between the first subsets 64,66 and the second subsets 68,70 and/or the height of the material slot 62. The PRLD may be dependant on the diameter of the optical fibers 52, the space between adjacent optical fibers 52, and end treatments applied to the optical fibers 52.

In one embodiment of the invention, the distance between the second ends 48,50 of the first subsets 64,66 of the optical fibers 52 and the second ends 48,50 of the second subsets 68,70 of the optical fibers 68,70 may be equal to or less than twice the PRLD. Alternatively, the distance between the second ends 48,50 of the subsets 64-70 may be equal to or less than twice the PRLD plus an amount approximately equal to the desired thickness of the strip of material 12. In other embodiments of the invention, the distance between the second ends 48,50 of the first subsets 64,66 and second ends 48,50 of the second subsets 68,70 may be equal to or less than the BPD plus twice the LRLD plus an amount approximately equal to the desired thickness of the strip of material. Alternatively, the distance between the second ends 48,50 may be equal to or less than the PRLD or some other value substantially less than twice the PRLD to accommodate for variations in the strip of material's lateral position between the second ends 48,50 of the two subsets 68,70. However, various methods for choosing the distance between the second ends 48,50 of the optical fibers 52 and/or the height of the material slot 62 may be employed using the BPD, the PRLD, the LRLD, the desired thickness of the strip of material 12, and/or other factors affecting the amount of light returned.

As the first face 15 of the strip of material 12 is positioned closer to the second ends 48,50 of the first subsets 64,66 of the optical fibers 52, the amount of light reflected into the first subset 66 of the optical fibers 52 of the receiving cable 22 decreases. As the first face 15 of the strip of material 12 is positioned closer to the PRLD, the amount of light reflected into the first subset 66 of the optical fibers 52 of the receiving cable 22 increases. However, if the first face 15 of the strip of material 12 is positioned further away than the PRLD from the ends 48,50 of the first subsets 64,66 of the optical fibers 52, then the amount of light reflected into the first subset 66 of the optical fibers 52 of the receiving cable 22 again decreases. Therefore, limiting the space between the ends 48,50 of the first and second subsets 64-70 of the optical fibers 52 provides that moving the strip of material 12 away from the ends 48,50 of the first subsets 64,66 of the optical fibers 52 only increases the light received by the first subset 66 of the optical fibers 52 of the receiving cable 22. The same logic holds true for the second subsets 68,70 of the optical fibers 52.

Because the light detector 32 receives the total light sensed by the optical fibers 52 of the receiving cable 22, movement in the position of the strip of material 12 toward or away from the second ends 48,50 will not adversely affect the results. This is because if the strip of material 12 shifts slightly toward the second ends 48,50 of the first subsets 64,66 of the optical fibers 52, allowing less light to be reflected into the first subset 66 of optical fibers 52, the strip of material will simultaneously move away from the second ends 48,50 of the second subsets 68,70 of the optical fibers 52, allowing more light to be reflected into the second subset 70 of optical fibers 52, which will result in the same amount of light as if the strip of material 12 is perfectly centered between the second ends 48,50 of the first subsets 64,66 and the second subsets 68,70 of the optical fibers 52.

Figure 11:
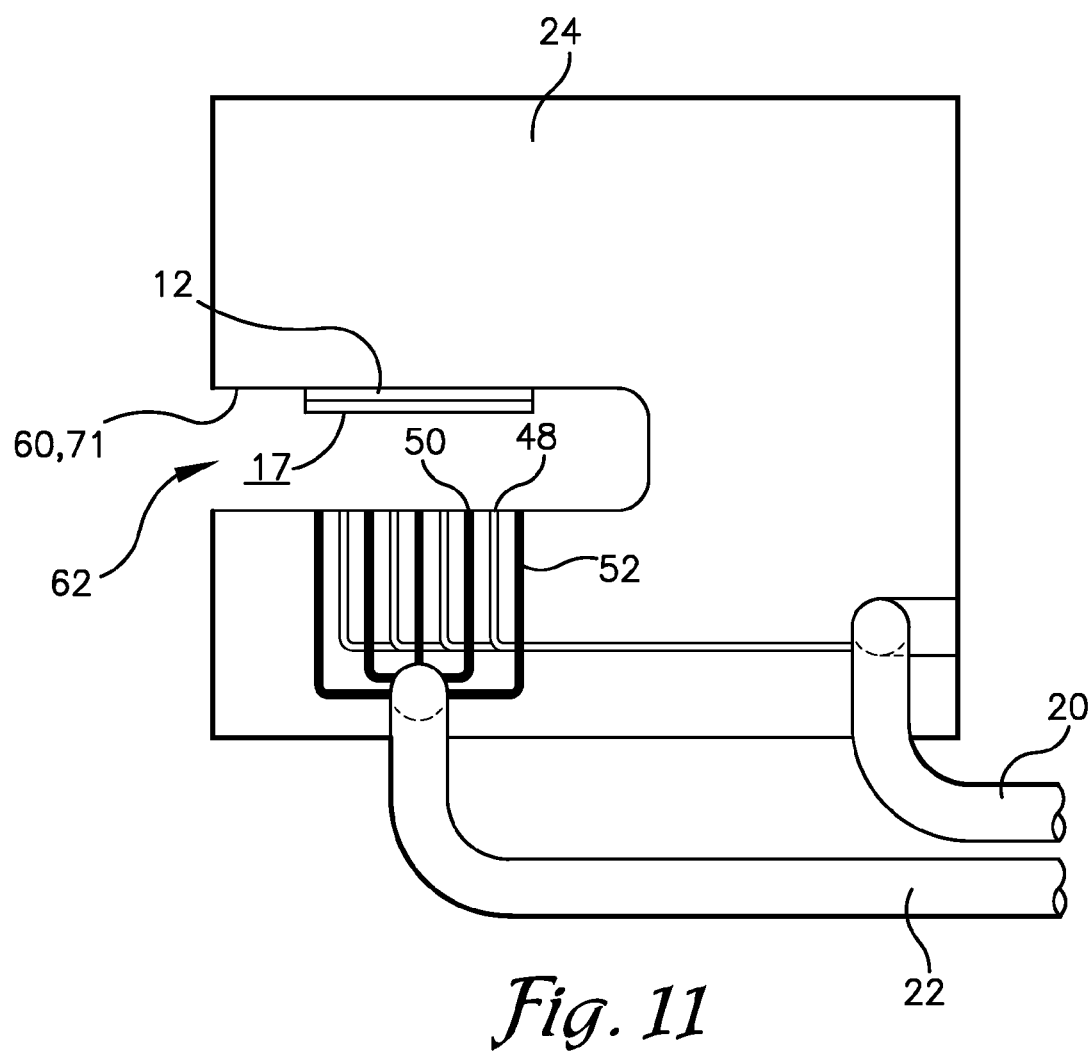
FIG. 11 is a vertical front fragmentary view of an alternative embodiment of the housing and optical fibers of the thickness detection apparatus of FIG. 1.

In an alternative embodiment of the invention, illustrated in FIG. 11, each of the second ends 48,50 of the optical fibers 52 may be spaced in alternating succession in a single row, with each of the second ends 48,50 facing either the first face 15 or the second face 17 of the strip of material. In this embodiment of the invention, since light is only reflected off of one of the faces 15,17 of the strip of material, the strip of material 12 is preferably restricted in such a way that it maintains contact with the inwardly facing surface 60 of the material slot 62, so that only the change in thickness of the strip of material 12 moves the first face 15 or the second face 17 closer to the second ends 48,50. For example, the strip of material 12 may be restricted against reference surface 71 of the inwardly facing surface 60 as illustrated in FIG. 11. Otherwise, movement of the strip of material 12 toward the second ends 48,50 may allow less light to be reflected into the receiving cable 22 and inadvertently trigger a false indication.

In operation, the thickness detection apparatus 10 may be used to implement a method of detecting an increase in thickness of a strip of material beyond a threshold thickness. The method broadly comprises the steps of shining light through the sending cable 20 toward the first and/or second faces 15,17 of the strip of material via the first subset 64 and/or the second subset 68 of the sending cable 20 and then receiving a portion of light reflected off of the first and/or second faces 15,17 into the first and/or second subsets 66,70 of the receiving cable 22. If the total amount of light received by the receiving cable 22 is below the threshold of tolerance, the indicator 34 may be actuated to the second state, indicating to a user or electronic device that the thickness of the strip of material 12 is too thick or that a splice has been detected. The amount of reflected light received by the optical fibers 52 of the receiving cable 22 is dependent on the thickness of the strip of material 12.

Figure 12:
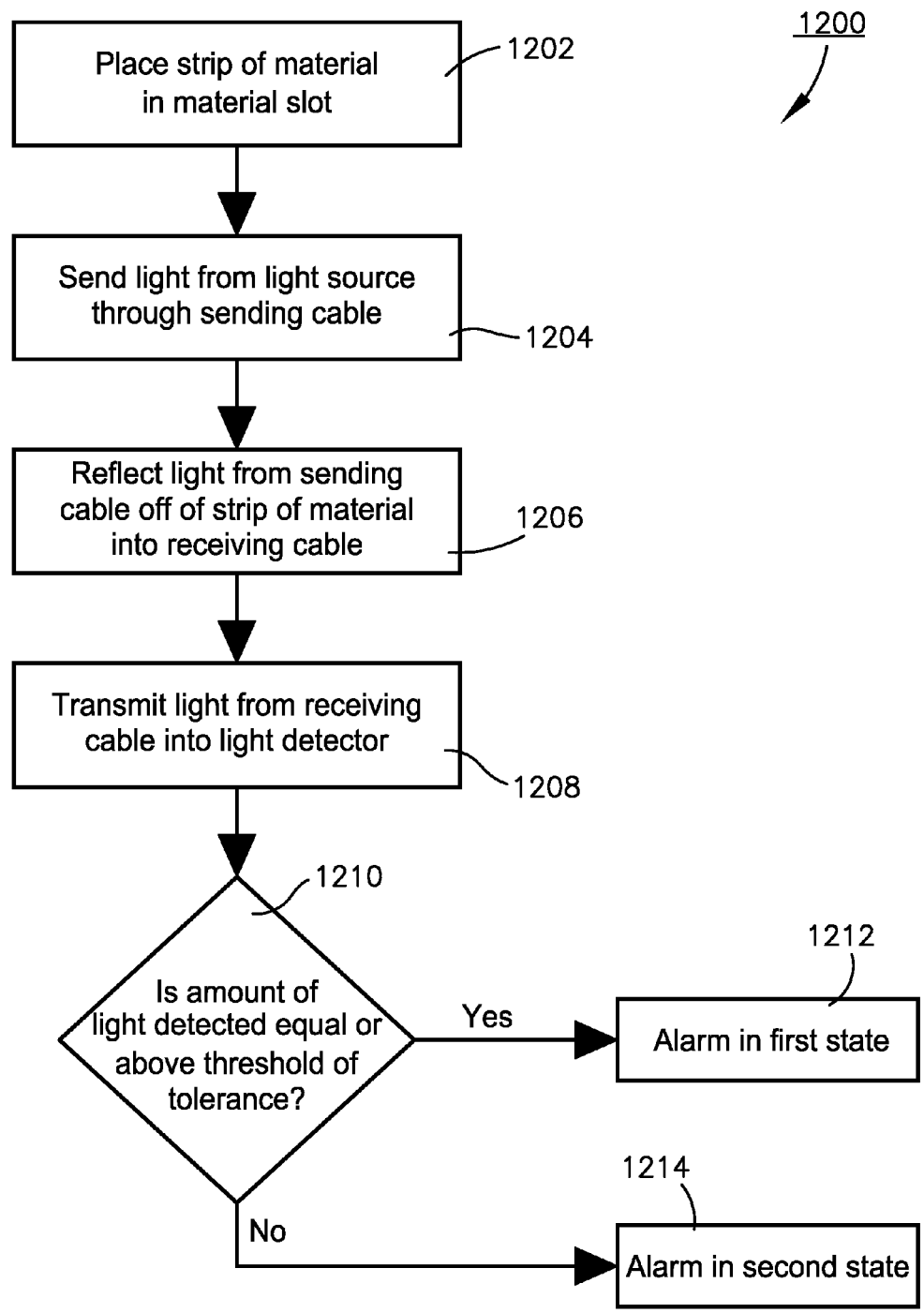
FIG. 12 is a flow chart of a method for detecting if the thickness of a strip of material deviates from a desired thickness using the thickness detection apparatus of FIG. 1.

The flow chart of FIG. 12 depicts the steps of exemplary methods of the invention in more detail. In this regard, some of the blocks of the flow chart may represent a module segment or portion of code of the computer programs stored in or accessible by the comparator 36. In some alternative implementations, the functions noted in the various blocks may occur out of the order depicted in FIG. 12. For example, two blocks shown in succession in FIG. 12 may in fact be executed substantially concurrently, or the blocks may sometimes be executed in the reverse order depending upon the functionality involved.

FIG. 12 depicts the steps of a thickness detection method 1200. As depicted in step 1202, the strip of material 12 may be placed in the material slot 62 according to the proper orientation, as defined above. In the proper orientation, the strip of material 12 may be substantially perpendicular to the direction of light extending out of the optical fibers 52. Additionally, as depicted in step 1204, the light source 30 may send light through the optical fibers 52 of the sending cable 20, resulting in light being shined onto the first face 15 and/or the second face 17 of the strip of material 12.

As depicted in step 1206, the receiving cable 22 may receive whatever portion of the light from the sending cable 20 that is reflected by the strip of material 12 into the optical fibers 52 of the receiving cable 22. Light may be transmitted from the receiving cable 22 to the light detector 32, as depicted in step 1208, and the detection element 18 may determine if the amount of light detected is below the threshold of tolerance, as depicted in step 1210.

If the amount of light detected is above the threshold of tolerance, as depicted in step 1212, the indicator 34 may be changed to or caused to remain in the first state. If the amount of light detected is below the threshold of tolerance, as depicted in step 1214, the indicator 34 may be changed to or caused to remain in the second state.

So, for example, the indicator 34 may remain off if the strip of material 12 is of the desired thickness, but if the strip of material 12 is larger than the desired thickness by a threshold amount, a sum of the distances from the first face 15 to the first subsets 64,66 of the optical fibers 52 and from the second face 17 to the second subsets 68,70 of the optical fibers 52 will be less than if the strip of material was the desired thickness. Therefore, the added thickness of the strip of material 12 moves at least one of the faces 15,17 closer to the optical fibers 52, causing less light to be reflected into the optical fibers 52 and less light to be detected by the light detector 32, causing the indicator 34 to be actuated by the detection element 18 to turn on. In some embodiments of the invention, if the strip of material 12 is thinner than the desired thickness, more light may be detected by the light detector 32, which may not cause the indicator 34 to be turned on. The indicator 34 may alert a user or an automated system that the thickness of the strip of material 12 is not of the desired thickness. For example, if the thickness of the strip of material 12 is thicker than the desired thickness by a given threshold amount, the indicator 34 may indicate the presence of a splice to the user or automated system via a visual, audible, and/or electrical signal. The electrical signal may additionally trigger a counter (not shown) to increase by one to track how many splices are detected in the strip of material. Furthermore, the electrical signal may be used by an automated system to determine a frequency of splices, a duration of a splice, and/or distances between adjacent splices.

In various embodiments of the invention, the detection element 18 may additionally be used to determine the actual amount of light received by the light detector 32, a percentage of the actual amount of light detected compared to the amount of light transmitted by the light source, whether the strip of material 12 is thicker than desired, whether the strip of material is thinner than desired, if the amount of light detected by the light detector 32 indicates the presence of a splice, a quantity of splices detected, a frequency of splices detected, etc. For example, an increase in light detected above a threshold amount may trigger the indicator 34 or an alternative indicator (not shown) to be turned on to indicate that the strip of material 12 is thinner than a desired thickness.

In some embodiments of the invention, if the strip of material 12 is composite tape or tow, a thickness greater than desired, particularly a thickness approximately twice as thick as the desired thickness, may indicate a splice of the strip of material 12. The detection element 18 and/or an external device communicably coupled with the detection element 18 may monitor how many times a splice is detected and may trigger the indicator 34 if the amount of splices or the frequency of splices is above a pre-determined threshold. In some embodiments of the invention, triggering the indicator 34 may comprise halting operation of a machine configured for laying composite tow onto a surface, discarding the strip of material 12, or somehow compensating for the large number of splices detected. In other embodiments, splice detection may be used by modeling software to determine where the splice will be placed relative to other splices in the finished composite part to insure that a limited number of splices are present in a given area of the finished composite part.

Advantageously, because the thickness detection apparatus 10 utilizes individual optical fibers 52 within the fiber optic cables 20,22, the design may allow a proximity of the two faces 15,17 of the strip of material 12 relative to the second ends 48,50 to be monitored without the use of two or more separate fiber optic cables sending light and two or more separate fiber optic cables receiving light. Therefore, because only one input and one output is required, a single detection element may be used. Also, the thickness detection apparatus 10 requires a limited amount of computations. For example, the apparatus does not require adding or comparing the amount of light reflected off of the first face 15 of the strip of material 12 with the light reflected off of the second face 17 of the strip of material 12. This is because the thickness detection apparatus 10 does not need to determine how much light is detected by each optical fiber 52 or each subset of optical fibers, but rather how much total light is reflected into the receiving cable 22.

Although the invention has been described with reference to the embodiments illustrated in the attached drawings, it is noted that equivalents may be employed and substitutions made herein without departing from the scope of the invention as recited in the claims. For example, the detection element 18 may have more or less components than described herein and its components may or may not be physically coupled and/or housed physically together.

Having thus described an embodiment of the invention, what is claimed as new and desired to be protected by Letters Patent includes the following:

1. An apparatus for detecting a change in thickness of an opaque strip of material, the strip of material having a first face and a second face opposite of the first face, the apparatus comprising:
   a light source configured for outputting light toward the first and second face of the strip of material;
   a light detector configured for receiving at least a portion of light from the light source reflected off of the first and second face of the strip of material;
   at least one sending cable having at least one first end and at least one second end and being configured and positioned for receiving light from the light source and transmitting a first portion of light toward the first face of the strip of material and a second portion of light toward the second face of the strip of material; and
   at least one receiving cable having at least one first end and at least one second end and being configured and positioned for transmitting the portion of light from the light source reflected off of the first and second faces of the strip of material to the light detector;
   a housing configured for fixing portions of the sending and receiving cables in said positions and for limiting movement of the strip of material toward and away from the sending and receiving cables in the direction of the thickness of the strip of material such that a total amount of light reflected off of the strip of material into the receiving cable and received by the light detector is inversely proportional to the thickness of the strip of material; and
   an indicator communicably coupled with the light detector and configured for indicating when a change in thickness of the material is detected based on the total amount of light received by the light detector,
   wherein the sending and receiving cables further comprise a plurality of optical fibers, wherein ends of at least a portion of optical fibers of the sending cable are fixed by the housing in spaced, side-by-side relationship and alternating succession with ends of at least a portion of optical fibers of the receiving cable,
   wherein the optical fibers of the sending cables are all configured to receive light from the light source and the optical fibers of the receiving cables are all configured to send light to the light detector,
   wherein the optical fibers of the sending cable are divided into a first subset and a second subset and the optical fibers of the receiving cable are divided into a first subset and a second subset,
   wherein the optical fibers of the first subset of the sending cable are arranged in alternating succession with the optical fibers of the first subset of the receiving cable and are configured to direct light onto the first face of the strip of material,
   wherein the optical fibers of the second subset of the sending cable are arranged in alternating succession with the optical fibers of the second subset of the receiving cable and are configured to direct light onto the second face of the strip of material.

2. The apparatus of claim 1, wherein the housing is configured to limit the movement of the strip of material such that the first face or the second face is no further away from the second ends of the sending and receiving cables than the peak reflected light distance (PRLD).

3. The apparatus of claim 1, wherein the indicator outputs an audible, visual, electric, or wireless signal to a user or an electronic device when the amount of light is above or below a desired amount of light by at least a threshold amount.

4. The apparatus of claim 1, further comprising a detection element including the light source, the light detector, a comparator, and the indicator, wherein the comparator is configured to determine if the total amount of light received by the light detector is below a threshold of tolerance and to actuate the indicator from a first state to a second state if the amount of light is below the threshold of tolerance.

5. An apparatus for detecting a change in thickness of a strip of material, the strip of material having a first face and a second face opposite of the first face with the thickness of the material disposed therebetween, the apparatus comprising:
   a detection element comprising:

a light source;

a light detector; and an indicator communicably coupled with the light detector;

a sending cable comprising a plurality of optical fibers each having a first end and a second end and configured for receiving light from the light source and transmitting it toward the strip of material;

a receiving cable comprising a plurality of optical fibers each having a first end and a second end and configured for receiving a portion of light output by the sending cable and reflected off of the first or second face of the strip of material then transmitting the reflected light to the light detector; and a housing configured for fixing the second ends of the optical fibers of the sending and receiving cables in spaced, side-by-side relationship with each other in alternating succession, wherein the housing is configured for shaping and focusing light fields extending from the second ends of the optical fibers of the sending cable and receiving fields of the second ends of the optical fibers of the receiving cables, wherein the housing is configured to limit movement of the strip of material toward and away from the second ends of the optical fibers in the direction of the thickness of the strip of material such that an amount of light reflected off of the strip of material into the receiving cable is inversely proportional to the thickness of the strip of material, wherein the indicator is configured to automatically actuate from a first state to a second state when the amount of light sent to the light detector is below a threshold of tolerance, wherein the optical fibers of the sending cable are divided into a first subset and a second subset and the optical fibers of the receiving cable are divided into a first subset and a second subset, wherein the optical fibers of the first subset of the sending cable are arranged in alternating succession with the optical fibers of the first subset of the receiving cable and are configured to direct light onto the first face of the strip of material, wherein the optical fibers of the second subset of the sending cable are arranged in alternating succession with the optical fibers of the second subset of the receiving cable and are configured to direct light onto the second face of the strip of material.

6. The apparatus of claim 5, wherein the housing is configured to limit the movement of the strip of material such that the first face or the second face is no further away from the second ends of the optical fibers than the peak reflected light distance (PRLD).

7. The apparatus of claim 5, wherein the indicator outputs an audible, visual, electric, or wireless signal to a user or an electronic device when the amount of light is above or below a desired amount of light by a threshold amount.

8. A method of determining an increase in the thickness of a strip of material, the method comprising:

directing light from a first subset of optical fibers of a sending fiber optic cable toward a first face of the strip of material;

directing light from a second subset of optical fibers of the sending cable toward a second face of the strip of material which is opposite of the first face of the strip of material;

receiving with a first subset of optical fibers of a receiving fiber optic cable a portion of light reflected off of the first face of the strip of material, wherein the first subset of optical fibers of the receiving cable have ends positioned substantially side-by-side and spaced in alternate succession with ends of the first subset of optical fibers of the sending cable;

receiving with a second subset of optical fibers of the receiving cable a portion of light reflected off of the second face of the strip of material, wherein the second subset of optical fibers of the receiving cable have ends positioned substantially side-by-side and spaced in alternate succession with ends of the second subset of optical fibers of the sending cable;

detecting with a light detector a total amount of light received by the first and second subsets of the receiving cable; and outputting an indicator signal to a user or an automated system if the amount of light detected is below the threshold of tolerance.

9. The method of claim 8, wherein the amount of light detected is inversely proportional to the thickness of the strip of material.

10. The method of claim 8, wherein the indicator signal is an audible, visual, electric, or wireless signal to a user or an electronic device.

11. The method of claim 8, further comprising passing the strip of material between the second ends of the first subsets of the optical fibers of the sending and receiving cables and the second ends of the second subsets of the optical fibers of the sending and receiving cables.

* * * * *